April 30, 1957 L. E. HANKISON 2,790,507
APPARATUS FOR FILTERING AND DEHYDRATING GASES
Filed Aug. 29, 1955 3 Sheets-Sheet 1

INVENTOR.
Lewis E. Hankison.
BY Hooper Leonard & Buell
HIS ATTORNEYS.

April 30, 1957 L. E. HANKISON 2,790,507
APPARATUS FOR FILTERING AND DEHYDRATING GASES
Filed Aug. 29, 1955 3 Sheets-Sheet 2

INVENTOR.
Lewis E. Hankison.
BY Hoopes Leonard & Buell
HIS ATTORNEYS

INVENTOR.
Lewis E. Hankison.
BY
*Hooper Leonard & Buell*
HIS ATTORNEYS.

United States Patent Office 2,790,507
Patented Apr. 30, 1957

2,790,507

APPARATUS FOR FILTERING AND DEHYDRATING GASES

Lewis E. Hankison, Pittsburgh, Pa., assignor to Hankison Corporation, Pittsburgh, Pa., a corporation of Pennsylvania Application August 29, 1955, Serial No. 531,119

12 Claims. (Cl. 183—32)

This invention relates to apparatus for filtering and dehydrating gases and, more particularly, apparatus for removing water, oil and other fluids and solids from compressed air.

Compressed air as prepared by conventional compressing equipment usually contains considerable quantities of water, oil and other foreign liquids in the form of vapor. When the temperature of the compressed air falls or for any other reason the dew point of the air is reached, the liquids will condense and collect. The presence of such water, oil and other liquids along with solid foreign particles is highly deleterious to the operation of industrial equipment particularly automation equipment where the accurate functioning of compressed air controls is necessary. It is, accordingly, necessary to remove as much of the vapor in the gas as possible prior to its use.

The present invention provides an outer shell having end closure members, a pair of spaced coaxial cylindrical members, one within the other within the shell and generally centralized therein, said cylindrical members having an annular space between them, a hollow helical conductor in said annular space in contact with said cylindrical members whereby to form a pair of side-by-side helical passages, one within the helical conductor itself and the second between the external walls of the helical conductor and the cylindrical members, inlet means for introducing gas to be dehydrated into the helical conductor through the outer shell, a spiral cooling chamber receiving the gas to be dehydrated from the helical conductor at the end thereof opposite the inlet means, filter means receiving the cooled gas from the cooling chamber and communicating with the second helical passage to deliver the cooled and filtered gas thereto at the end adjacent the cooling chamber, outlet means at the opposite end of said second passage and collection means communicating with the cooling chamber receiving liquid recovered from the gases. Preferably, the turns of the helical conductor are spaced so that the area of the second passage is substantially equal to the area within the helical conductor. The cooling chamber is preferably in the form of a cylinder having a spiral wall beginning adjacent the axis and running to the outside wall. A cooling coil carrying water at a temperature approaching the freezing point follows a tortuous path through the area formed by adjacent turns of the spiral wall. Cooling water is preferably circulated from a coolant sump where the water is cooled by contact with refrigerant condenser coils. Preferably, the outer shell is insulated to prevent loss of cooling effectiveness to the outside air.

Certain advantages, objects and features of this invention will be apparent from the foregoing general description of my invention. Other advantages, purposes and features of this invention will be apparent from a consideration of the following description and the accompanying drawings in which Figure 1 is a side elevation of a preferred form of filtering and dehydrating apparatus according to this invention;

Figure 1:
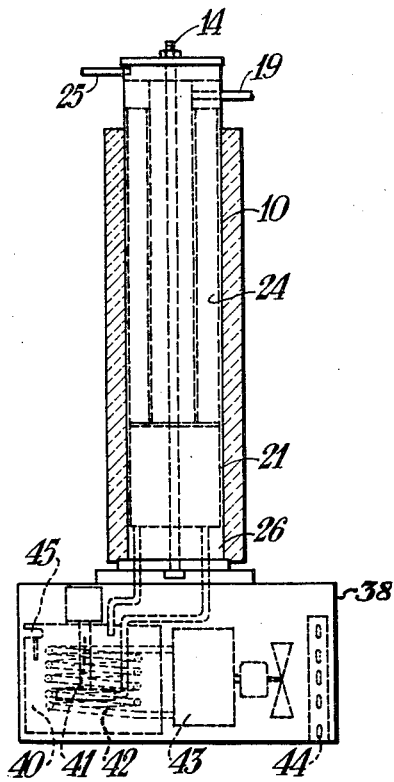
Figure 2:
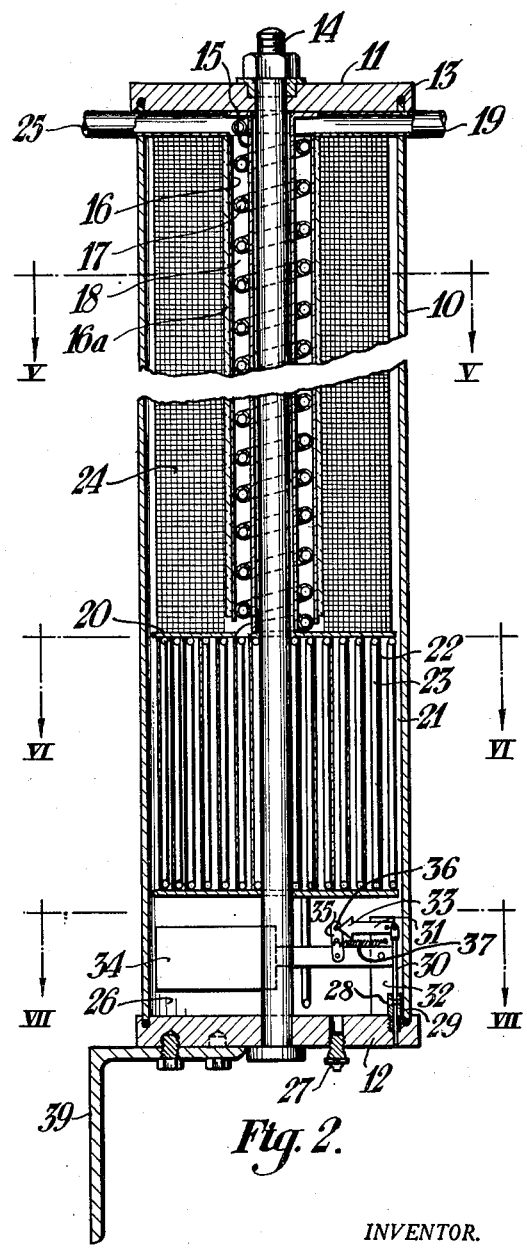
Figure 2 is a vertical section of the filtering and dehydrating apparatus of Figure 1 above the refrigeration unit.
Figure 6:
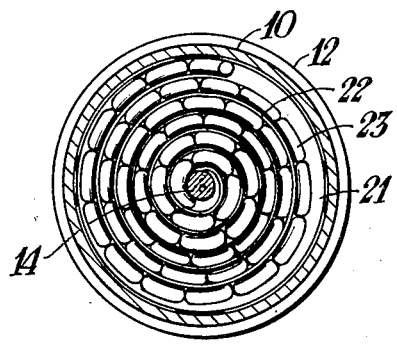
Figure 6 is a section on the line VI—VI of Figure 2.
Figure 3:
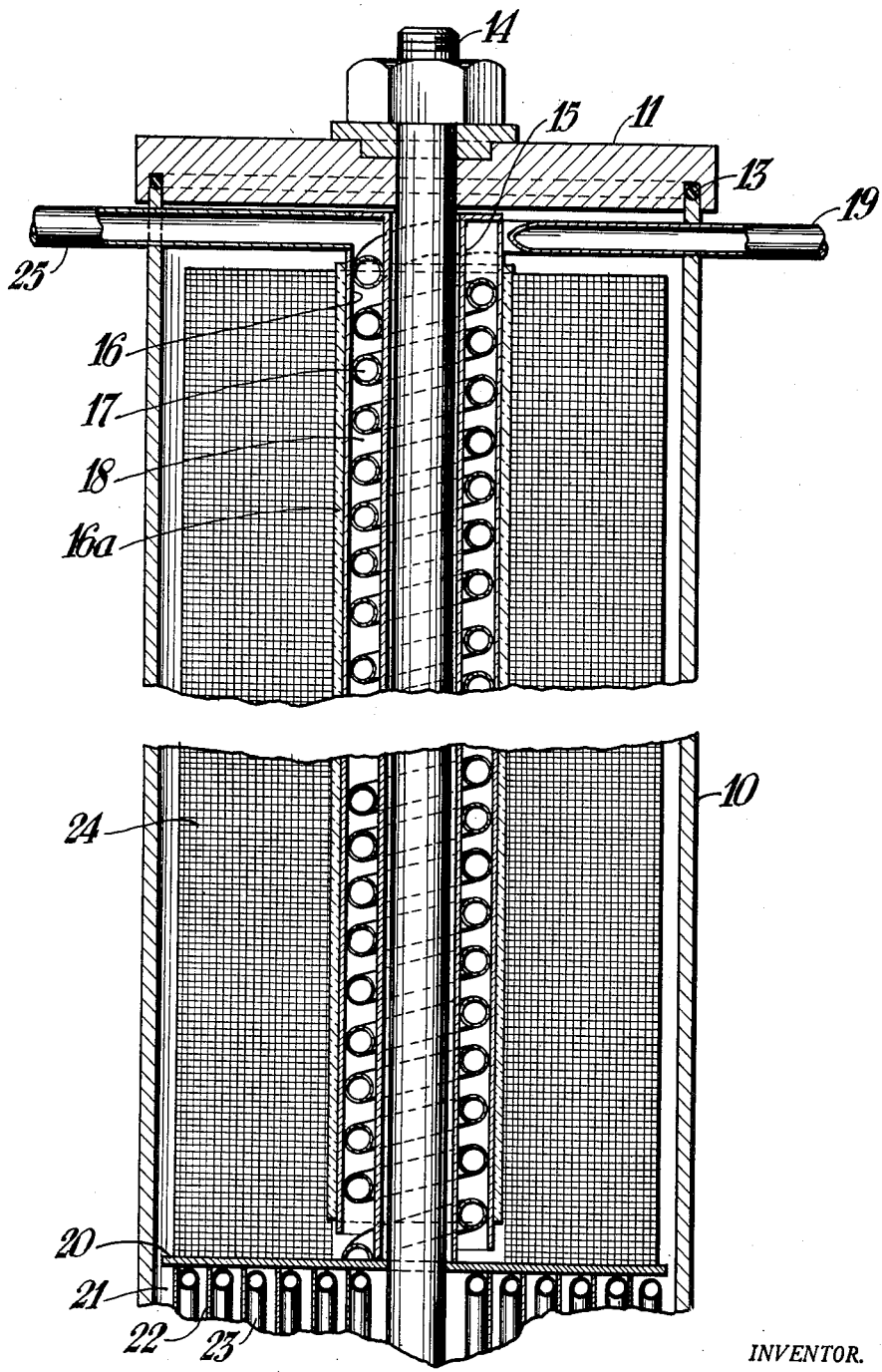
Figure 3 is an enlarged vertical section of the filtering chamber of the apparatus of Figure 1.
Figure 4:
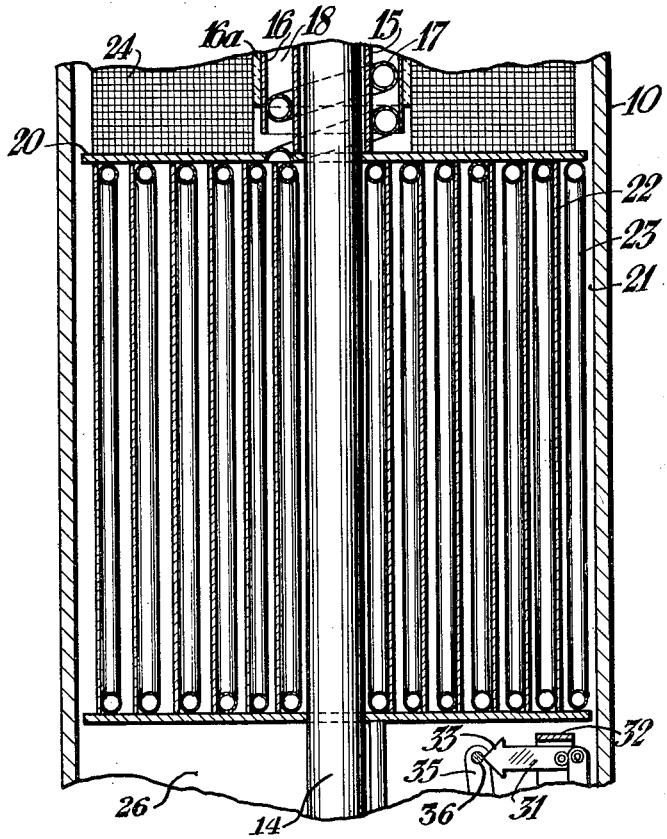
Figure 4 is an enlarged vertical section of the cooling chamber of Figure 1.
Figure 5:
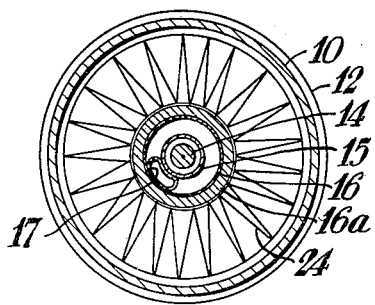
Figure 5 is a section on the line V—V of Figure 2.
Figure 7:
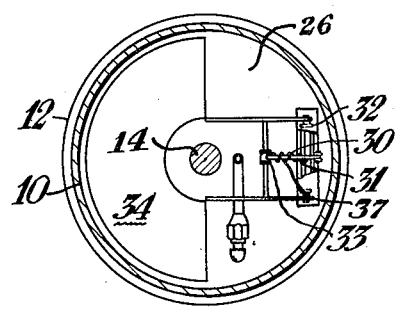
Figure 7 is a section on the line VII—VII of Figure 2.

Referring to the drawings, I have illustrated an outer shell 10 having end members 11 and 12 closing the ends and in sealing engagement with O-rings 13. The end members 11 and 12 are held in place by an axial rod or bolt 14. A pair of coaxial cylinders 15 and 16, preferably of copper extend centrally of the shell 10 around the bolt 13. Preferably, an insulating shell 16a surrounds the cylinder 16 to prevent heat exchange through the wall of the cylinder. A helical coil of copper tubing 17 is fixed in the annular space between the two cylinders 15 and 16 forming therewith a second helical passage 18 with opposed convex walls. Preferably the cross-sectional area of the passage formed within the copper tubing 17 is equal to the cross-sectional area of the helical passage 18. An inlet opening 19 connects to one end of the helical tubing 17. The opposite end of the tubing 17 discharges through a dividing plate 20 into the axis of a spiral cooling chamber 21 formed by a spiral wall 22 carrying cooling coils 23. The cooling chamber 21 discharges around the edge of the dividing plate 20 into a filter 24. The filter 24 removes foreign material from the gas and discharges it beneath the end of cylindrical member 16 into the spiral passage 18 from which it leaves the dehydrating apparatus through outlet 25.

Water and other liquids which are condensed in tubing 17 and the cooling chamber 21 fall by gravity into a collecting chamber 26 carrying a blow down valve 27 and an automatic discharge valve 28. The collected liquids are held in chamber 26 under the pressure of the system. The automatic discharge valve may have a seat 29 cooperating with a plunger 30 to control the discharge of liquid from the chamber 26. The plunger 30 is connected to a control arm 31 pivoted in a support member 32. The control arm 31 is provided with a double-faced triangular cam 33. A float 34 is pivoted on the support member 32 below the control arm 31 and carries a pair of spaced lever arms 35 with a cam follower 36 between them. The cam follower 36 is held in contact with the cam 33 by means of a spring 37 engaging the lever arms and the support member. When the liquid in the collection chamber rises sufficiently to lift the float 34 and carry the cam follower 36 over the point of the cam 33 the spring 37 forces the cam follower to run up on the cam and raise the plunger 30 from the seat 29. The spring 37 holds the cam follower in this open position until the liquid level drops sufficiently to cause the float to carry the cam follower over the point of the cam whereupon the cam is forced upwardly to close the plunger in the seat.

A base 38 is provided beneath the shell 10 to which the shell 10 is attached by an angle support member 39. In the base 38 there is provided a coolant sump 40 carrying cooling water for the cooling coils 23. A pump 41 is provided in the sump and is connected to coils 23 to force cooling water therethrough. Refrigerant evaporator coils 42 surround the pump 41 in the sump 40 to cool the water to a temperature approaching the freezing point of the water. The evaporator coils are supplied with refrigerant from a conventional compressor 43 and condenser 44 connected together in the usual manner.

I have found that the use of coolant water from a sump wherein the water is in contact with refrigerator evaporator coils will produce a more satisfactory and even temperature control in the cooling chamber 21 than will the direct use of refrigerator evaporator coils in the cooling chamber 21.

Preferably, I provide a switch 45 adjacent the refrigerant coils 42 which will maintain a layer of ice on the coils within certain limits. This reduces the number of on and off cycles of the compressor 43 and maintains a substantially constant temperature in the coolant sump 40 about the pump 41.

The operation of the filtering and dehydrating apparatus of my invention is generally as follows. Compressed air coming from a compressor or other source of air under pressure enters the inlet 19 and passes through the helical coil 17 downwardly between the cylindrical members 15 and 16. Here its temperature is reduced by the cooled gas passing upwardly through passage 18 between the coils 17. The air passes from the coil 17 into the cooling chamber 21 where it follows the spiral path formed by walls 22 and cooling coils 23 to the outer periphery of the cooling chamber. The vapors which are condensed from the air in its passage through coil 17 and cooling chamber 21 fall into the collecting chamber 26. The cooled dehydrated gas leaves the cooling chamber 21 around the plate 20 and goes into the filter 24 where particles of dirt and dust are collected. The filter air then passes under the bottom of cylindrical member 16 and upwardly through passage 18 and out of the dehydrating unit through outlet 25.

The apparatus of this invention will produce an effluent gas with a very much lower vapor content than any heretofore possible, with a temperature close to ambient, and at a very low cost. In addition, it makes possible the production of such dehydrated gases in areas where no satisfactory means has heretofore been available, as for example, in hot, humid climates and the like.

While I have illustrated and described a presently preferred embodiment of my invention it will be understood that it may be otherwise embodied within the scope of the following claims.

I claim:

1. An apparatus for filtering and dehydrating gases comprising an outer cylindrical shell, a pair of interfitting helical passages having a common wall therebetween forming a cylindrical member within the shell, generally centrally thereof, inlet means for introducing gas to be dehydrated into one of said helical passages through the outer shell, a cooling chamber receiving the gas to be dehydrated from said one helical passage at the end thereof opposite the inlet means, filter means receiving the cooled gas from the cooling chamber and communicating with the other of said helical passages to deliver the cooled and filtered gas thereto adjacent one end thereof, outlet means at the opposite end of said other passage, and collection means communicating with the cooling chamber receiving liquid recovered from the gases.

2. An apparatus as claimed in claim 1 wherein the cross-sectional area of the helical passages is substantially equal.

3. An apparatus for filtering and dehydrating gases comprising an outer cylindrical shell having end closure members, a pair of spaced coaxial cylindrical members one within the other within the shell and coaxial therewith, said cylindrical members having an annular space between them, a hollow helical conductor in said annular space in contact with said cylindrical members whereby to form a pair of side-by-side helical passages, one within the helical conductor and the second between the external walls of the helical conductor and the cylindrical members, inlet means for introducing gas to be dehydrated into the helical conductor through the outer shell, a spiral cooling chamber receiving at its axis the gas to be dehydrated from the helical conductor at the end thereof opposite the inlet means, filter means receiving the cooled gas from the cooling chamber and communicating with the second helical passage to deliver the cooled and filtered gas thereto at the end adjacent the cooling chamber, outlet means at the opposite end of said second passage and collection means communicating with the cooling chamber receiving liquid recovered from the gases.

4. An apparatus as claimed in claim 3 wherein the turns of the helical conductor are spaced so that the area of the second passage is substantially equal to the area within the helical conductor.

5. An apparatus for filtering and dehydrating gases comprising an outer cylindrical shell having end closure members, a pair of spaced coaxial cylindrical members one within the other within the shell and coaxial therewith, said cylindrical members having an annular space between them, a hollow helical conductor in said annular space in contact with said cylindrical members whereby to form a pair of side-by-side helical passages, one within the helical conductor and the second between the external walls of the helical conductor and the cylindrical members, inlet means for introducing gas to be dehydrated into the helical conductor through the outer shell, a cooling chamber receiving the gas to be dehydrated from the helical conductor at the end thereof opposite the inlet means, a cylindrical filter means within and spaced from the shell, said filter means surrounding the outer cylindrical member receiving the cooled gas from the cooling chamber, port means in the outer cylindrical member communicating between the filter means and the second helical passage to deliver the cooled and filtered gas to the second helical passage at one end, outlet means at the opposite end of the second passage, and collecting means communicating with the cooling chamber receiving liquid recovered from the gases.

6. An apparatus for filtering and dehydrating gases comprising an outer cylindrical shell having end closure members, a pair of spaced coaxial cylindrical members one within the other within the shell and coaxial therewith, said cylindrical members having an annular space between them, a hollow helical conductor in said annular space in contact with said cylindrical members whereby to form a pair of side-by-side helical passages, one within the helical conductor and the second between the external walls of the helical conductor and the cylindrical members, inlet means for introducing gas to be dehydrated into the helical conductor through the outer shell, a spiral cooling chamber receiving at its axis the gas to be dehydrated from the helical conductor at the end thereof opposite the inlet means, conductor means in said cooling chamber traversing said spiral, reservoir means maintaining a pool of liquid coolant at a substantially constant temperature adjacent the shell, pump means for the said liquid coolant, connections between said pump and the conductor means in the cooling chamber whereby liquid coolant is delivered to the conductor means from the reservoir means, filter means receiving the cooled gas from the cooling chamber and communicating with the second helical passage to deliver the cooled and filtered gas thereto at the end adjacent the cooling chamber, outlet means at the opposite end of said second passage, and collection means communicating with the cooling chamber receiving liquid recovered from the gas.

7. Apparatus for filtering and dehydrating gas as claimed in claim 6 wherein the reservoir means is provided with means extracting heat from the liquid coolant to maintain the pool of liquid at a temperature approximating the freezing temperature of the liquid coolant.

8. Apparatus for filtering and dehydrating gas as claimed in claim 6 wherein the reservoir means is provided with an evaporator coil surrounding the pump and in contact with the liquid coolant, means supplying refrigerant to the evaporator coil and means on the coil regulating the supply of refrigerant to the coil whereby to maintain a layer of frozen coolant on said coil.

9. In apparatus for filtering and dehydrating gas having a cooling chamber and a filter chamber receiving cooled gas from said cooling chamber, a pair of interfitting helical passages lying between the same two planes and having a common wall between them and forming an elongated cylindrical member, inlet means for introducing gas to be cooled into one of said helical passages, said passage delivering the gas to the cooling chamber, connections from the filter chamber delivering the cooled and filtered gas to the second passage adjacent the delivery end of the first passage, and outlet means at the opposite end of said second passage.

10. In apparatus for filtering and dehydrating gas having a cooling chamber and a filter chamber receiving cooled gas from said cooling chamber, a pair of spaced coaxial cylindrical members one within the other forming an annular space therebetween, a hollow helical tube in said annular space in contact with said cylindrical members whereby to form a pair of side-by-side helical passages, one within the helical conductor and the second between the helical tube and the cylindrical members, inlet means for introducing gas to be dehydrated into the helical tube for delivery at the opposite end to the cooling chamber, connections from the filter chamber delivering the cooled and filtered gas to the second passage adjacent the delivery end of the helical tube, and outlet means at the opposite end of said second passage.

11. An apparatus for filtering and dehydrating gases comprising an outer cylindrical shell, a pair of interfitting helical passages having a common wall therebetween forming a cylindrical member within the shell, generally centrally thereof, an insulating shell surrounding and in contact with said cylindrical member, inlet means for introducing gas to be dehydrated into one of said helical passages through the outer shell, a cooling chamber receiving the gas to be dehydrated from said one helical passage at the end thereof opposite the inlet means, filter means receiving the cooled gas from the cooling chamber and communicating with the other of said helical passages to deliver the cooled and filtered gas thereto, outlet means at the opposite end of said other passage, and collection means communicating with the cooling chamber receiving liquid recovered from the gases.

12. An apparatus for filtering and dehydrating gases comprising an outer cylindrical shell having end closure members, a pair of spaced coaxial cylindrical members one within the other within the shell and coaxial therewith, said cylindrical members having an annular space between them, an insulating shell surrounding the outer of said pair of cylindrical members, a hollow helical conductor in said annular space in contact with said cylindrical members whereby to form a pair of side-by-side helical passages, one within the helical conductor and the second between the external walls of the helical conductor and the cylindrical members, inlet means for introducing gas to be dehydrated into the helical conductor through the outer shell, a spiral cooling chamber receiving at its axis the gas to be dehydrated from the helical conductor at the end thereof opposite the inlet means, filter means positioned between said outer shell and said insulating shell, said filter means receiving the cooled gas from the cooling chamber and communicating with the second helical passage to deliver the cooled and filtered gas thereto at the end adjacent the cooling chamber, outlet means at the opposite end of said second passage, and collection means communicating with the cooling chamber receiving liquid recovered from the gases.

References Cited in the file of this patent

UNITED STATES PATENTS

| | | |
|---|---|---|
| 709,763 | Grumbacher | Sept. 23, 1902 |
| 1,354,058 | Norton | Sept. 28, 1920 |
| 2,355,373 | Hankison | Aug. 8, 1944 |